Aug. 18, 1942.  B. MEESOOK  2,293,398
APPARATUS FOR SEPARATING MATERIALS
Filed Dec. 10, 1940  2 Sheets-Sheet 2

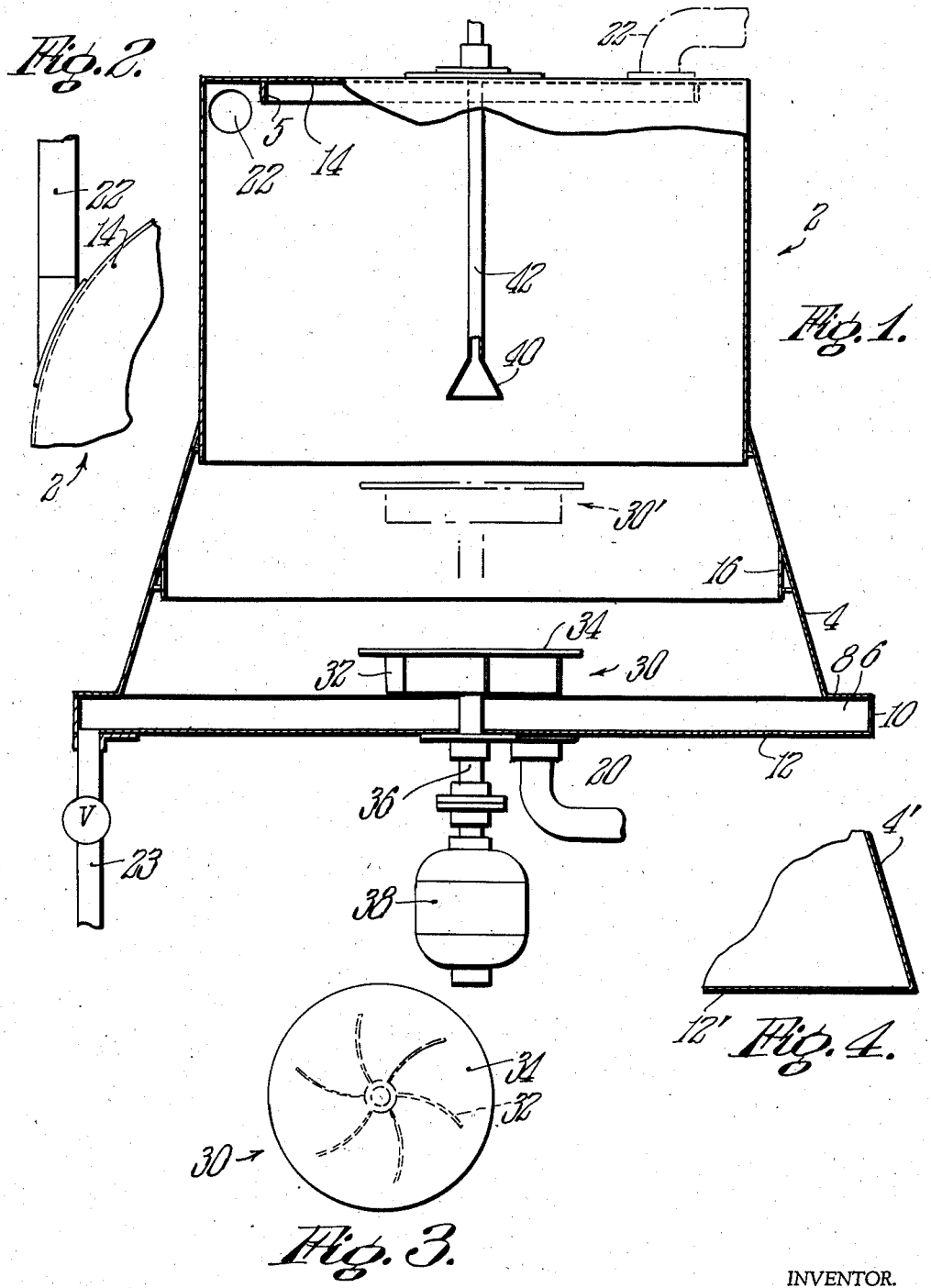

INVENTOR.
Boonyium Meesook,
BY
Walter C. Pm, Attorney.

Patented Aug. 18, 1942

2,293,398

UNITED STATES PATENT OFFICE 2,293,398

APPARATUS FOR SEPARATING MATERIALS

Boonyium Meesook, Washington, D. C.

Application December 10, 1940, Serial No. 369,443
In Great Britain April 19, 1940

4 Claims. (Cl. 209—211)

This invention relates to improvements in methods of and apparatus for separating materials and is directed more particularly to improvements in methods and apparatus for separating substances or particles in a liquid, for concentrating suspensions and other purposes.

The method and apparatus, among other numerous and various uses, is adapted for separating foreign substances from paper-making stock although in describing the novelty of the invention in connection therewith it will be understood that the invention is not to be so limited.

The apparatus of the invention is characterized in a general way by the provision of a tank which is preferably cylindrical and has a rotatable impeller adapted to cause liquid delivered into the tank to rotate or swirl around the tank so that particles and foreign substances not desired are directed more or less outwardly so as to be separated out and discharged. The liquid from which the particles and substances have been separated is discharged at the upper side of the tank and in the center of the liquid a suction device is provided for drawing off such foreign substances as are not thrown outwardly.

The novel features of the invention are adapted for broad application and various changes and modifications may be made in the form of the apparatus to adapt it for various purposes without departing from the spirit and scope of the invention.

In the drawings:

Fig. 1 is a sectional elevational view through one form of the apparatus of the invention;

Fig. 2 is a fragmentary plan view of the tank shown in Fig. 1 to explain one way in which a discharge conduit may be connected thereto;

Fig. 3 is a plan view of the impeller of the apparatus shown in Fig. 1;

Fig. 4 is a partial sectional view to explain a certain modification of the construction shown in Fig. 1.

Figure 5:
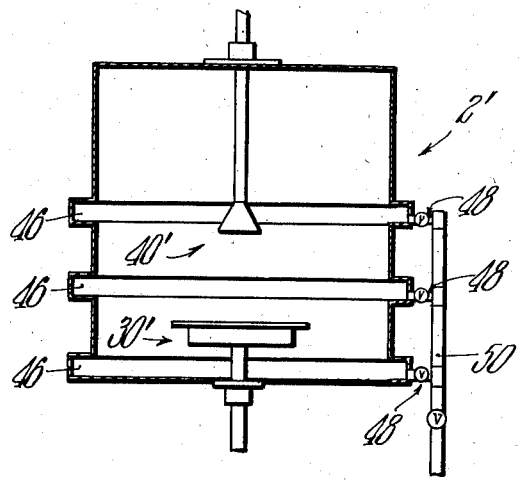
Figs. 5 and 6 are views similar to Fig. 1 to illustrate other modifications of the invention.

Referring now to the drawings in detail, the invention will be fully described.

The apparatus with reference to Figs. 1, 2 and 3 includes a tank or receptacle 2 which is preferably cylindrical and has a lower wall part 4 outwardly inclining to an annular or circumferential chamber formed by wall parts 8 and 10 adjacent a lower wall 12. The chamber may be called a collection chamber. An upper wall 14 closes the upper side of the tank and a peripheral wall 16 substantially vertically disposed is provided in the lower tapering part, as shown.

One or more inlets for the liquid such as 20 and one or more discharge outlets 22 therefor are provided. These may be of such size and so located as to facilitate liquid being delivered to and discharged from the tank. There may be one or more discharge outlets such as 23 for particles and foreign substances separated from the liquid.

An impeller 30 has a plurality of vanes 32 of any desired form and an upper plate 34. This impeller is preferably carried for rotation by a shaft 36 which may be rotated at the desired speed by any suitable means such as an electric motor 38. The construction may be such that the impeller may be located at different distances upwardly from the bottom wall 12 such as for instance is indicated by dot-dash lines 30'. The location of the impeller will depend on conditions, features of construction and requirements which are more less variable.

In the upper part of the tank there is a vacuum nozzle or collector 40 associated with a conduit 42 which may be connected to a suitable source of suction such as a pump or the like. The conduit 42 may be reciprocable or adjustable up and down to reciprocate the nozzle or to locate the same where desired. Preferably the nozzle will be disposed substantially centrally of the tank, and it may be reciprocated up and down during the operation of the apparatus, or located in some desired location.

In practice the liquid is delivered to the tank through the inlet or inlets 20 at such a head as may be desired. The rotating impeller causes the liquid to swirl around the tank or to rotate therein and move upwardly from the inlet to the discharge outlet.

In the case of paper making stock which contains paper-making fibers and various foreign substances and particles which are relatively heavier than the paper fibers the said substances and particles are thrown outwardly towards and against the side walls of the tank and wall 16 so as to settle. Eventually the foreign materials find their way into the channel 6 and are discharged through the outlet or outlets 23. Relatively lighter foreign substances and particles find their way to the center of the revolving liquid which is more or less in the form of a whirlpool and are taken up by the suction nozzle 40. This nozzle as explained may be axially adjustable so as to be disposed for the most effective action or reciprocated up and down during the operation of the apparatus. The liquid from which the foreign substances are removed is discharged through the discharge or discharges 22. A ring 5 depends from the upper wall which in the operation of the apparatus tends to prevent foreign substances thrown outwardly against the walls from flowing inwardly. The action is such that foreign substances and particles are separated and discharged so that the liquid in which the paper-making fibers are suspended is free of the particles and materials with which it is usually contaminated.

The disc-like part 34 of the impeller overcomes the tendency of air and liquid to be drawn into the impeller from above which would result in interfering with the desired smooth rotating or whirlpool action of the liquid regarded as necessary or as contributing to the separating function of the apparatus.

The tank may take various forms and have various means for collecting the foreign substances and materials and for conducting the same from the tank. As an illustration the circumferential lower side wall 4' of the tank may extend directly to the lower wall 12' and may be desirable in some cases or with some types of liquid.

Fig. 5 shows another modification of the invention wherein the tank 2' has a plurality of vertically spaced circumferential collecting channels 46 with discharge connections 48 leading to a discharge conduit 50. The said connections 48 include valves as shown.

There is an impeller 30' and a suction nozzle 40' as in the former case that may be axially adjustable and one or more inlets and outlets, not shown, are provided.

Figure 6:
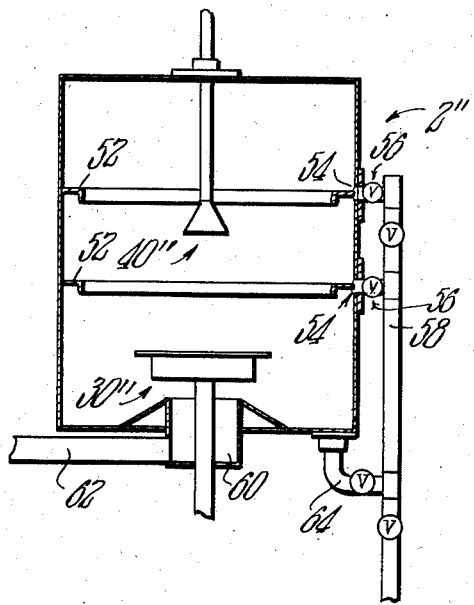

In the modification of Fig. 6, the tank 2" is provided with vertically spaced annular rings 52 with openings 54 in the side of the tank connected by connections 56 to a conduit 58, the said connections including valves, as shown.

A sump 60 in the lower side of the tank may receive the liquid through an inlet or inlets 62 while a discharge or discharges 64 for contaminated stock or foreign matter connects the lower side of the tank to the conduit 58. As in the former cases there is an impeller 30" and a suction nozzle 40" and one or more discharge outlets, not shown.

With the apparatus of Fig. 5 the whirling or rotation of the liquid causes the foreign substances to be thrown outwardly so as to settle in or be collected in the channels and pass therearound into and out the connections 48. There may be as many channels and conduits with connections as may be desired, and, of course, any desired number of inlet and discharge openings for the liquid.

The suction nozzle 40' functions as and for the purpose of the nozzle 40 in Fig. 1.

With the apparatus shown in Fig. 6 the particles and foreign substances settle on or are collected by the rings and pass out openings 54 into conduit 58 or are discharged through connection 64. The impeller and suction nozzle, of course, functioning as with the other modification of the invention.

It will be observed that the rotating impeller constructed as it is causes the liquid to be rotated or swirled in whirlpool fashion and in a smooth not over turbulent manner so that relatively heavy particles and foreign substances are thrown outwardly so as to be separated and discharged from the liquid. Such substances as are in the center of the liquid and are relatively light are taken up by the suction nozzle which may be operated intermittently or continuously and reciprocated up and down by any suitable means.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus of the class described comprising in combination, a cylindrical tank having a lower liquid inlet and an upper discharge therefor, an impeller rotatable centrally of said tank to rotate liquid around said tank, means around the periphery of said tank for collecting foreign substances thrown outwardly by liquid as it rotates, discharge means for said substances leading from said collecting means, and a suction nozzle for foreign substances disposed centrally of the tank above said impeller reciprocably towards and away from said impeller.

2. Apparatus of the class described comprising in combination, a cylindrical tank having a lower liquid inlet and an upper discharge therefor, an impeller rotatable centrally of said tank to rotate liquid around said tank, means around the periphery of said tank for collecting foreign substances thrown outwardly by liquid as it rotates, discharge means for said substances leading from said collecting means, and a suction nozzle for foreign substances disposed centrally of the tank above said impeller, said suction nozzle including a conical open ended member carried by a conduit reciprocably mounted for up and down movements relative to the impeller.

3. Apparatus of the class described comprising in combination, a cylindrical tank vertically disposed having a lower liquid inlet and an upper discharge therefor, an impeller rotatable centrally of the tank below said discharge on an axis parallel to that of the tank, collecting means around the periphery of said tank for collecting foreign substances thrown outwardly by liquid as it rotates including a chamber of larger diameter than said tank, and discharge means for said foreign substances leading from said collecting means, said impeller including a plurality of radially extending blades and a disc-like member overlying said blades.

4. Apparatus of the class described comprising in combination, a cylindrical tank vertically disposed having a lower liquid inlet and an upper discharge therefor, an impeller rotatable on a vertical axis centrally of the tank below said discharge, separate collecting means at the periphery and spaced vertically of the tank for collecting foreign substances thrown outwardly by liquid as it rotates, and discharge means leading from said collecting means, said collecting means including chambers of relatively greater diameter than said tank and said impeller including radially disposed blades and a disc-like member thereover.

BOONYIUM MEESOOK.